United States Patent
Ohrt et al.

(10) Patent No.: US 11,586,025 B2
(45) Date of Patent: Feb. 21, 2023

(54) SCANNING IMMERSION MICROSCOPY

(71) Applicant: Carl Zeiss Microscopy GmbH, Jena (DE)

(72) Inventors: Thomas Ohrt, Golmsdorf (DE); Michael Goegler, Wolfratshausen (DE); Thorsten Kues, Bovenden-Eddigehausen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 236 days.

(21) Appl. No.: 16/640,710

(22) PCT Filed: Aug. 8, 2018

(86) PCT No.: PCT/EP2018/071472
§ 371 (c)(1),
(2) Date: Feb. 20, 2020

(87) PCT Pub. No.: WO2019/038084
PCT Pub. Date: Feb. 28, 2019

(65) Prior Publication Data
US 2020/0183136 A1    Jun. 11, 2020

(30) Foreign Application Priority Data
Aug. 21, 2017   (DE) .......................... 102017119094.5

(51) Int. Cl.
*G02B 21/00*   (2006.01)
*G02B 21/33*   (2006.01)
*G02B 21/34*   (2006.01)

(52) U.S. Cl.
CPC .......... *G02B 21/002* (2013.01); *G02B 21/33* (2013.01); *G02B 21/34* (2013.01)

(58) Field of Classification Search
CPC ...... G02B 21/002; G02B 21/33; G02B 21/34; G01N 21/05; G01N 21/15; B01L 3/508; B01L 3/5085; B01L 3/502707
See application file for complete search history.

(56) References Cited

U.S. PATENT DOCUMENTS 5,200,152 A    4/1993  Brown
6,555,384 B1 *  4/2003  Angros ................. G02B 21/34
                                                    436/63

(Continued)

FOREIGN PATENT DOCUMENTS

DE         86 24 431.0        1/1987
DE    20 2011 005 278 U1    11/2012

(Continued)

OTHER PUBLICATIONS

Chinese Search Results for CN 2018800539051, Mar. 2, 2021 (1 page).

(Continued)

*Primary Examiner* — Mustak Choudhury
(74) *Attorney, Agent, or Firm* — Christensen, Fonder, Dardi & Herbert PLLC

(57) ABSTRACT

A method for the microscopy scanning of a specimen. An immersion medium is used between a slide and a microscope objective, said immersion medium wetting a surface of the slide, and the microscope objective being relatively displaced over the surface of the slide for imaging. The surface is provided with a coating which repels the immersion medium.

13 Claims, 2 Drawing Sheets

(56) References Cited

U.S. PATENT DOCUMENTS

| | | | |
|---|---|---|---|
| 6,809,794 B1 | 10/2004 | Sewell | |
| 8,001,857 B2 * | 8/2011 | Kahl | G02B 21/34 422/547 |
| 8,465,708 B2 | 6/2013 | Harada et al. | |
| 8,465,709 B2 | 6/2013 | Harada et al. | |
| 2004/0257962 A1 * | 12/2004 | Walker | G11B 7/1374 369/112.01 |
| 2005/0179997 A1 | 8/2005 | Komatsu et al. | |
| 2006/0264650 A1 | 11/2006 | Arora | |
| 2006/0275918 A1 | 12/2006 | Harada et al. | |
| 2007/0018057 A1 | 1/2007 | Kovac | |
| 2008/0137064 A1 | 6/2008 | Arata et al. | |
| 2014/0333998 A1 | 11/2014 | Kohli et al. | |
| 2015/0241682 A1 | 8/2015 | Kues et al. | |
| 2015/0260975 A1 * | 9/2015 | Schon | G02B 21/26 359/368 |
| 2015/0361279 A1 | 12/2015 | Fournand | |
| 2017/0199368 A1 | 7/2017 | Goodwin et al. | |
| 2018/0275397 A1 | 9/2018 | Chung et al. | |

FOREIGN PATENT DOCUMENTS

| | | |
|---|---|---|
| EP | 1 679 541 A1 | 7/2006 |
| EP | 1 717 628 A1 | 11/2006 |
| EP | 2 256 535 A1 | 12/2010 |
| JP | 2009-217049 A | 9/2009 |
| JP | 4603295 B2 | 12/2010 |
| WO | WO 2015/181367 A1 | 12/2015 |
| WO | WO 2017/099459 A1 | 6/2017 |

OTHER PUBLICATIONS

Ta, Van Duong, et al., "Laser textured superhydrophobic surfaces and their applications for homogeneous spot deposition," *Applied Surface Science*, vol. 305, pp. 153-159 (2016).

Groten, Jonas, et al., "Light-Induced Switching of Surfaces at Wetting Transitions through Photoisomerization of Polymer Monolayers," *Langmuir*, vol. 28, No. 42, 9 pages (2012).

Guenther, "Light-sheet microscopy," https ://sguenther.eu/science/light-sheet-microscopy/, 5 pages.

Lahann, Joerg, et al., "A Reversibly Switching Surface," *Science*, vol. 299, pp. 371-374 (Jan. 17, 2003).

Keller, H. Ernst, "Objective Lenses for Confocal Microscopy," *Handbook of Biological Confocal Microscopy*, Third Edition, pp. 145-161 (2006).

Hell, S., et al., "Aberrations in confocal fluorescence microscopy induced by mismatches in refractive index," *Journal of Microscopy*, vol. 169, Pt. 3, pp. 391-405 (Mar. 1993).

Murphy, Douglas B., "Fundamentals of Light Microscopy and Electronic Lighting," 385 pages (2013).

Nakayama, Masamichi, et al., "Light-sensitive Fluoropolymer Coated Surface for Control of Cell Adhesion Behavior," *Society for Biomaterials Annual Meeting and Exposition*, ISBN: 978-1-5108-0106-6, 4 pages (2015).

Rosario, Rohit, et al., "Lotus Effect Amplifies Light-Induced Contact Angle Switching," *J. Phys. Chem. B.*, vol. 108, No. 34, 3 pages (2004).

Takei, Yoshiyuki G., et al., "Dynamic Contact Angle Measurement of Temperature-Responsive Surface Properties for Poly(N-isopropylacrylamide) Grafted Surfaces," *Macromolecules*, pp. 6163-6166 (1994).

Tkaczyk, Alan H., et al., "Fluidic Switching of High-Speed Air-Liquid Two-Phase Flows Using Electrowetting-on-Dielectric," $7^{th}$ *Int. Conference on Micro Total Analysis Systems, Microtas*, pp. 461-464 (Oct. 5, 2003).

Yao, Lin, et al., "Recent progress in antireflection and self-cleaning technology—From surface engineering to functional surfaces," *Progress in Materials Sciences*, vol. 61, pp. 94-143 (2014).

\* cited by examiner

SCANNING IMMERSION MICROSCOPY

PRIORITY CLAIM

The present application is a National Phase entry of PCT Application No. PCT/EP2018/071472, filed Aug. 8, 2018, which claims priority from German Patent Application 10 2017 119 095.5, filed Aug. 21, 2017, the disclosures of which are hereby incorporated by reference herein in their entirety.

FIELD OF THE INVENTION

The invention relates to a method for examining a sample by scanning microscopy, wherein an immersion medium is used between a sample carrier and a microscope objective, said immersion medium wetting a surface of the sample carrier, and, for imaging purposes, the microscope objective is displaced in relative fashion over the surface of the sample carrier. Further, the invention relates to a sample carrier or cover slip for examining a sample, to be disposed on the sample carrier or under the cover slip, by scanning microscopy.

In microscopy, the use of immersion objectives offers many advantages, which ultimately arise from the higher obtainable numerical apertures of the objectives. An immersion medium with a refractive index that is as high as possible but does not exceed that of the cover slip of the sample maximizes the aperture in microscopy. Different immersion media are used depending on the type of sample, including organic replacement media for water, e.g., Carl Zeiss Immersol W and Immersol G. As a rule, the immersion media are liquid at the normal temperature. Water-based immersion media are used for microscopy of living cells situated in an aqueous environment. Since the refractive indices of the immersion medium and of the sample medium are very similar in that case but the cover slip, as a rule, has a different refractive index, an optical correction is needed to avoid spherical aberrations when penetrating deeper into the sample. However, this correction only applies to a certain cover slip thickness and type, which is why water immersion objectives generally have a correction mechanism that, by displacing a lens or lens group in the objective, corrects the deviations from the cover slip thickness and type that form the basis of the correction.

The prior art has disclosed various approaches for ensuring that a front lens of a microscope objective is wetted as completely as possible with an immersion medium. EP 1717628 A1 and EP 2256535 A1 disclose a mechanism for inverted microscope objectives, i.e., microscope objectives that examine a sample by microscopy from below. A mechanism is provided on the front edge of the objective casing, said mechanism preventing a drop of immersion liquid placed on the front lens from running off over the front edge of the objective casing. Moreover, provision is made of outflow tubes that drain the immersion liquid downward in targeted fashion. An inner zone of the edge is configured to repel the immersion liquid for which the microscope is designed. A surrounding outer zone is configured in exactly the opposite way, and so it drains immersion liquid reaching it to the outside. With reference to further publications, JP 4603295 discusses various concepts that avoid contamination of the objective interior with immersion liquid. Two of the solutions described therein correspond to those of the specified EP documents. A third solution, which is described in the Japanese publication, provides for a groove on the objective that prevents excess immersion liquid from running into the objective. Further, for an oil immersion-based microscope, JP 4603295 proposes a lipophilic coating on the lens surface, which is surrounded by a lipophobic coating on the edge of the lens surface. Thus, the prior art is concerned in various approaches with avoiding contamination of an objective with immersion liquid or draining excess immersion liquid in a targeted manner.

US 2015/0241682 A1, provides elastomeric immersion media. These are shape-stable but elastically deformable plastics or polymers, the glass transition point of which is situated below the temperature of use. Such elastomeric immersion media can elastically deformable under a tensile or compressive load, but subsequently return back to their original undeformed form.

SUMMARY OF THE INVENTION

Difficulties arise when using immersion media, particularly in the case of scanning microscopy. The travel speed with which the objective can be displaced over the sample is limited by the fact that shear forces occur at too high movement speeds, said shear forces possibly leading to the immersion film tearing off or to an inadmissible deformation of an elastomeric immersion medium. In the case of an elastomeric immersion medium, an excessive shear force can sometimes displace the cover slip and thus lead to the sample being destroyed. A sample holder that is not completely fixed can also be displaced in this way, rendering it impossible to approach defined coordinates in the sample again. These problems can only be counteracted by using an excessive amount of immersion medium at the beginning of the microscopy process in order to compensate for the fact that the immersion medium is lost or deformed due to the travel speed and the resulting shear forces, leading to parts of the beam path being without immersion medium. As a result, however, the sample becomes contaminated by the immersion medium and the immersion medium consumption is sometimes quite high, which is costly.

The invention is therefore based on the object of specifying a method for scanning immersion microscopy of the type specified at the outset, in which the aforementioned problem of the scanning speed and the immersion medium consumption has been solved.

The embodiments of the invention are defined in the independent and dependent claims.

In scanning immersion microscopy, the surface of the sample carrier or of the cover slip, which is provided for use with the immersion medium and over which the likewise wetted immersion objective is displaced in relative fashion, is configured in such a way that it repels the immersion medium, for example by way of a treatment to be repulsive, in particular a repulsive coating. In this way, very much lower shear forces act in the immersion medium. In the case of an immersion liquid, the surface is not smeared with immersion liquid. A drop, once applied, remains on the objective because, due to the repulsive properties, it does not adhere to, or smear on, the surface of the sample carrier or cover slip. An elastomeric immersion is distorted much less or not at all, and so, as a result, the relative speed between microscope objective and sample carrier/cover slip can be increased and, at the same time, the problem of contamination is reduced on account of the immersion-repellent coating of the surface. What was found surprisingly here is that a coating of the sample carrier/cover slip with immersion-repellent properties, which by itself appears disadvantageous at a first glance, leads to a high quality during microscopy since the immersion medium remains reliably concentrated in the gap between microscope objective and sample carrier/cover slip and in front of the front lens of the microscope objective.

To the extent that reference is made here to the surface of the sample carrier or cover slip pointing toward the microscope objective, this is tantamount to the surface to be wetted with the immersion medium. In the method with a cover slip, the surface of the cover slip pointing away from the sample carrier is wetted with the immersion medium. In respect of the sample carrier or cover slip, the surface provided for wetting with the immersion medium is provided with a lipophobic, hydrophobic or omniphobic configuration.

The term surface treatment stipulates that this obtains the desired repulsive properties. The treatment can be a coating. This is preferred and will be described below purely by way of example. Equally, however, a structure could also be introduced into the surface, said structure producing the repulsive properties, or the surface could be treated in some other way, for example chemically, in order to obtain the repulsive properties.

For microscopy, a sample carrier or cover slip is provided, the surface of which, which is subsequently wetted with immersion medium, has been treated accordingly. The terms "sample carrier" and "cover slip" should be interpreted broadly here and comprise membranes or other sample delimiting elements, in particular. Such elements are included insofar as the sample carrier or cover slip is mentioned below. Depending on the application, two-sided repulsive properties are also possible, specifically if they do not interfere with the application of the sample substance on the opposite side. In the case with only single-sided repulsion, it may be preferable to apply a marking that allows the repulsive side to be identified. The marking may be applied either on the repulsive side or opposite thereto; ultimately, it only serves to distinguish between the two sides, particularly in cases where the repulsion itself is not identifiable optically.

Omniphobic repulsion, i.e., a surface property that is both hydrophobic and lipophobic, is particularly preferred. Then, the sample carrier/the cover slip is equally suitable for oil immersion microscopy and water immersion microscopy.

The repulsive treatment of the sample carrier or cover slip allows the immersion objective to be removed from the sample in such a way that as far as possible no immersion liquid remains on the sample carrier/cover slip. There are various options here. Firstly, the objective can simply be removed from the surface of the sample carrier/cover slip. In so doing, the distance between the objective and the treated surface is increased until the immersion liquid remains as completely as possible on the objective due to the repulsive properties of the surface of the sample carrier/cover slip. As an alternative or in addition thereto, the objective can be displaced laterally until it has been moved over the edge of the sample carrier/cover slip. In this way, the immersion liquid is likewise manipulated such that it remains on the objective and not on the sample carrier/cover slip. This procedure is advantageous in that a change between an objective with immersion and an objective without immersion, e.g., an objective embodied as an overview objective, is easily possible, without the image deteriorating. As no immersion liquid remains on the surface following the removal of the immersion objective, no disturbances arise for the immersion-free objective, e.g., the overview objective, either.

The proposed measures are possible in the case of an inverted microscope, and equally in the case of upright microscopy or for light sheet microscopy, too.

It is understood that the features specified above and the features yet to be explained below can be used not only in the specified combinations, but also in other combinations or on their own, without departing from the scope of the present invention.

BRIEF DESCRIPTION OF THE DRAWINGS

The invention is explained in even more detail below on the basis of exemplary embodiments, with reference being made to the appended drawings, which likewise disclose features essential to the invention. These exemplary embodiments are only illustrative and should not be construed as restrictive. By way of example, a description of an exemplary embodiment with a multiplicity of elements or components should not be construed as meaning that all of these elements or components are necessary for implementation. Rather, other exemplary embodiments could also contain alternative elements and components, fewer elements or components or additional elements or components. Elements or components of different exemplary embodiments can be combined with one another, unless stated otherwise. Modifications and variations, which are described for one of the exemplary embodiments, can also be applicable to other exemplary embodiments. To avoid repetitions, the same or corresponding elements in different figures are de-noted by the same reference sign and are not explained multiple times. In the figures.

DETAILED DESCRIPTION

Figure 1:
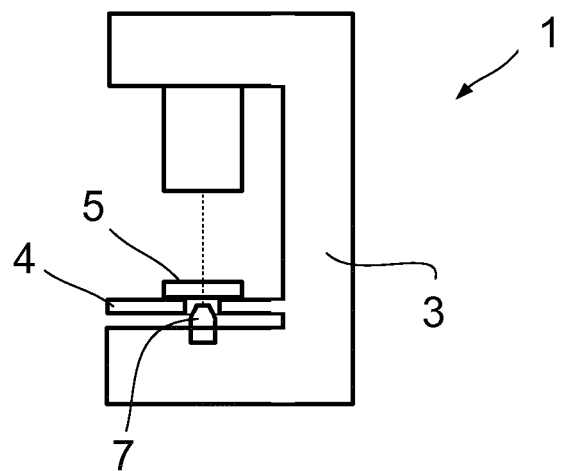
FIG. 1 shows a schematic illustration of an inverted microscope.

FIG. 1 schematically shows a microscope 1, which comprises a nosepiece 2 in a base of a limb 3. A sample stage 4, on which a sample 5 is disposed, is also situated on the limb 3. An illumination device illuminates the sample 5 from above, an objective 7 held in the nosepiece 2 images the illuminated sample 5 from its surface 6 facing the objective (cf. FIG. 2).

Figure 2:
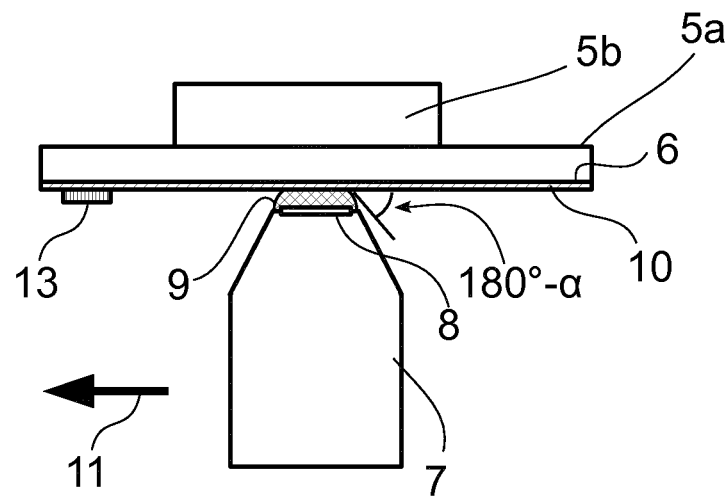
FIG. 2 shows an enlarged detail of the illustration of FIG. 1.

FIG. 2 shows an enlarged view of the relationships between the objective 7 and the sample 5, the latter consisting of a sample carrier 5a, in this case a Petri dish, with, lying thereon, sample substance 5b.

The objective 7 comprises a front lens 8, on which an immersion liquid 9 is applied. The immersion liquid is selected appropriately depending on the application, i.e., the sample. In general, the objective 7 is designed for a specific immersion liquid. The immersion liquid 9 is located in a gap between the sample carrier 5a and the front lens 8 of the objective 7. The objective 7 and sample carrier 5a are displaced relative to one another, which is visualized in FIG. 2 by an arrow 11. The objective 7 is displaced in this exemplary embodiment. It is equally possible to move the sample carrier 5a or both. Additionally, the objective 7 can image the sample 5b via a cover slip. So that the immersion liquid 9 does not smear on the sample carrier 5a during the displacement along the arrow 11 and thus is lost from the gap between front lens 8 and sample carrier 5a, the surface 6 of the sample carrier 5a facing the objective 7 is provided with a coating 10, which has a repellent effect on the immersion medium 9. If the immersion medium 9 is water-based, use can be made of a hydrophobic coating 10, for example. A lipophobic coating 10 can be used in the case of oil-based immersion liquids. An embodiment in which an omniphobic coating 10—i.e., a coating that is both lipophobic and hydrophobic—is used is particularly preferred. Such a coating is suitable for all possible types of sample carriers 5a, e.g., also for a membrane or a sample receiving vessel. In order to identify the surface 6 that is provided with the coating 10, the sample carrier 5a optionally has a marking 13 when said sample carrier has a symmetric embodiment, e.g., as a glass mount, the marking being applied to the coating 10 in the embodiment illustrated in FIG. 2 and allowing an identification of the coated surface. This is advantageous in that the coating 10 is one-sided and not disposed on the surface of the sample carrier 5a on which the sample substance 5b lies. Consequently, an interaction between the coating 10 and the sample substance 5b is precluded. As a rule, it would be disadvantageous since the type of immersion liquid, as a rule, equals the type of sample substance 5b. A water-based immersion medium 9 is required for aqueous samples 5b or samples 5b mounted in aqueous media. The coating 10 is then at least hydrophobic (or omniphobic) and would also repel the aqueous sample 5b in the case of a two-sided application on the sample carrier 5a/the cover slip. An analogous statement applies to an oil-containing sample 5b.

The effect of the coating 10 is that the immersion liquid 9 is repelled at the surface 6 on which the coating 10 has been applied. FIG. 2 elucidates this by a contact angle $\alpha$ of more than 90° (the counter angle 180°-$\alpha$ is plotted in the figure).

Figure 3:
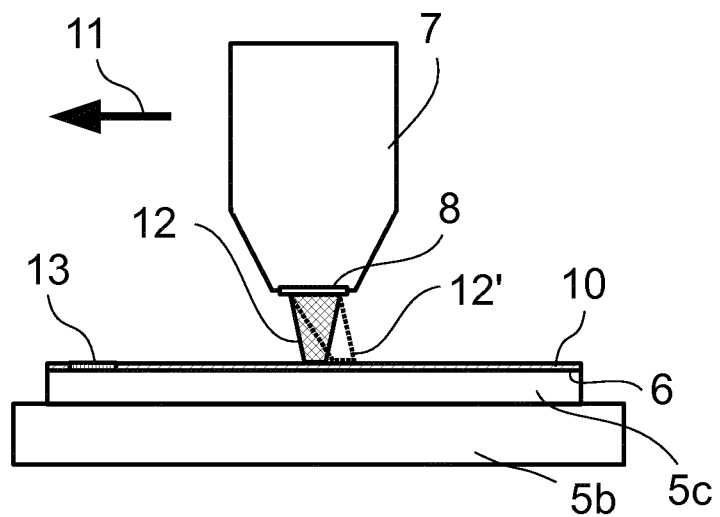
FIG. 3 shows the conditions of a microscope with an elastomeric immersion medium in the case of erect microscopy.

FIG. 3 shows the conditions in the case of an erect microscope, wherein, additionally, an elastomeric immersion is used as an immersion medium. Here, the sample 5b is covered by a cover slip 5c, the surface 6 of which pointing to the objective 7 likewise being provided with the coating 10, which is omniphobic in this exemplary embodiment. This coating prevents the elastomeric immersion from being deformed in the way indicated by the dashed form 12' during the relative displacement along the arrow 11. Such a deformation would occur if the repulsive coating 10 would be missing. Shown here, too, in exemplary fashion is that the marking 13 can be applied not only to the coating 10 but can also be provided in the coating 10. Equally, it is possible to provide the marking 13 on the opposite side. All that is important is that the marking 13 allows identification of the side on which the coating 10 that is only provided on one side is applied.

Figure 4A:
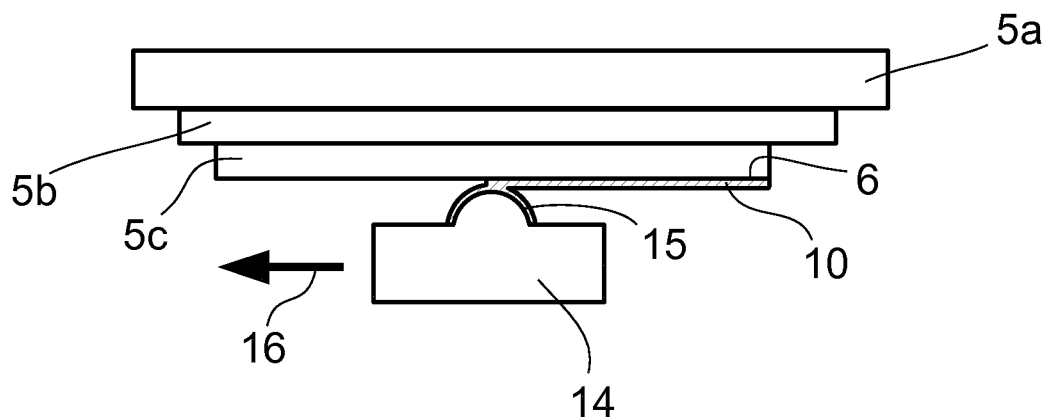
FIG. 4A-4B show various options of applying a coating to a sample carrier or a cover slip.
Figure 4B:
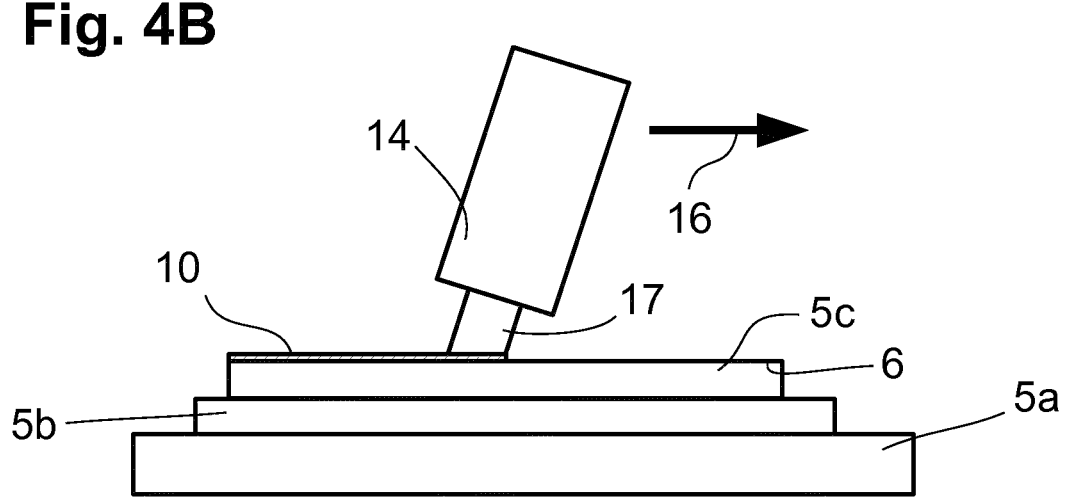

The coating 10 used during microscopy can already be stored on the sample carrier or the cover slip, as shown in FIGS. 2 and 3. In embodiments, it is equally possible to apply the coating only within the scope of the production of the preparation which is to be examined by microscopy. FIGS. 4A and 4B show possibilities to this end. In FIG. 4A, the coating 10 is applied from the liquid phase using an applicator 14, which comprises a roller 15 that has been wetted with a liquid substance, the substance forming the coating 10 following the application. The applicator 14 is guided along the arrow 16 over the surface 6 of the cover slip 5c or of the sample carrier 5a in such a way that the roller 15 rolls over the surface 6 and applies the coating 10 in the process. The roller 15 is continuously wetted with the substance in the applicator 14.

FIG. 4B shows an applicator 14 that is embodied in the style of a felt tip pen. By way of an application element 17, which is fed from a reservoir provided in the applicator 14, the coating 10 is applied to the surface 6 of the cover slip 5c.

Consequently, in embodiments of the microscopy method, the sample 5a is firstly applied to a sample carrier 5a and covered by a cover slip 5c where necessary, and then the surface 6, which will subsequently lie opposite the microscope objective 7, is provided with the coating 10. To this end, the applicators of FIGS. 4A and 4B are some of a plurality of options. A further option would lie in the spraying-on of a substance that forms the coating 10, the application with a coating cloth, etc.

The invention claimed is:

1. A method for examining a sample by scanning microscopy, comprising the steps of:
   using an immersion medium comprising a deformable elastomeric immersion medium between a sample carrier or a cover slip and a microscope objective, said immersion medium contacting the sample carrier or the cover slip,
   displacing, for imaging purposes, the microscope objective relatively over the sample carrier or the cover slip, and
   using the sample carrier or cover slip, having a surface facing toward the microscope objective such that the surface repels the deformable elastomeric immersion medium,
   wherein the surface comprises a surface treatment providing the surface with hydrophobic or omniphobic properties.

2. The method as claimed in claim 1, further comprising the steps of initially applying the sample to a sample carrier and then treating the surface of the sample carrier, which faces the microscope objective during the examination by microscopy, to be repelling.

3. The method as claimed in claim 2, wherein treating the surface of the sample carrier to be repelling comprises adding a repellant coating to the surface of the sample carrier.

4. The method as claimed in claim 2, wherein treating the surface of the sample carrier to be repelling comprises adding a structure into the surface of the sample carrier.

5. The method as claimed in claim 1, wherein the sample carrier comprises a Petri dish or a microtiter plate.

6. The method as claimed in claim 1, further comprising the steps of initially applying the sample to a sample carrier, placing a cover slip on the sample for covering purposes, and then treating the surface of the cover slip, which faces the microscope objective during the examination by microscopy, to be repelling.

7. The method as claimed in claim 6, wherein treating the surface of the cover slip to be repelling comprises adding a repellant coating to the surface of the cover slip.

8. The method as claimed in claim 6, wherein treating the surface of the cover slip to be repelling comprises adding a structure into the surface of the cover slip.

9. A microscope comprising a microscope objective, a sample carrier or cover slip for examining a sample, to be disposed on the sample carrier or under the cover slip, by scanning microscopy, and a deformable elastomeric immersion medium between the microscope objective and the sample carrier or cover slip,
   wherein the sample carrier or the cover slip comprises a surface to be disposed toward the objective, and the deformable elastomeric immersion medium is configured to be in contact with the surface, and wherein the surface comprises a surface treatment providing the surface with hydrophobic or omniphohic properties, such that the surface repels the deformable elastomeric immersion medium.

10. The microscope as claimed in claim 9, wherein the sample carrier or cover slip comprises a marking that indicates a repelling side.

11. The microscope as claimed in claim 9 wherein the sample carrier includes a Petri dish or a microtiter plate.

12. The microscope of claim 9, wherein the surface treatment comprises a hydrophobic or omniphobic coating.

13. The microscope of claim 9, wherein the surface treatment comprises structures configured to produce repulsive properties.

* * * * *